United States Patent [19]

Hoop

[11] 4,315,611
[45] Feb. 16, 1982

[54] DEVICE FOR SUSPENDING ARTICLES FROM A CEILING OR THE LIKE

[76] Inventor: James B. Hoop, 8127 E. 12-Apt. 2, Tulsa, Okla. 74112

[21] Appl. No.: 103,050

[22] Filed: Dec. 13, 1979

Related U.S. Application Data

[62] Division of Ser. No. 921,893, Jul. 5, 1978, Pat. No. 4,221,355.

[51] Int. Cl.³ ............................................. B42F 13/00
[52] U.S. Cl. .................................. 248/340; 248/228; 248/317
[58] Field of Search ............... 248/317, 340, 339, 228, 248/226.5, 214; 52/39; 24/73 MF, 84 B

[56] References Cited

U.S. PATENT DOCUMENTS

| | | | |
|---|---|---|---|
| 3,003,735 | 10/1961 | Havener | 248/228 |
| 3,327,376 | 6/1967 | Freeman et al. | 248/489 X |
| 3,561,718 | 2/1971 | Iverson | 248/489 X |
| 3,618,176 | 11/1971 | Barnes | 24/84 B |
| 3,936,913 | 2/1976 | Weissman | 248/489 X |
| 3,952,985 | 4/1976 | Davenport | 248/489 X |
| 4,065,090 | 12/1977 | Mauney | 24/73 R X |
| 4,074,885 | 2/1978 | Hacker | 248/317 |

FOREIGN PATENT DOCUMENTS 2616074 4/1976 Fed. Rep. of Germany ...... 248/339

*Primary Examiner*—J. Franklin Foss
*Attorney, Agent, or Firm*—Head & Johnson

[57] ABSTRACT

A device for suspending articles from a ceiling, or the like, and comprising a plate member having oppositely disposed flange engaging elements thereon for selective engagement with the opposite edges of a ceiling channel member, and a hook member extending outwardly from the plate member for receiving the article or articles thereon which are to be suspended from the ceiling.

1 Claim, 11 Drawing Figures

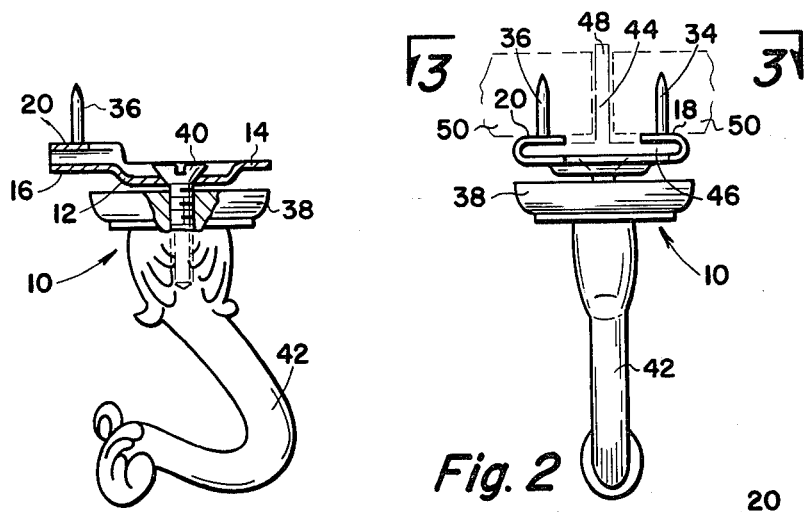
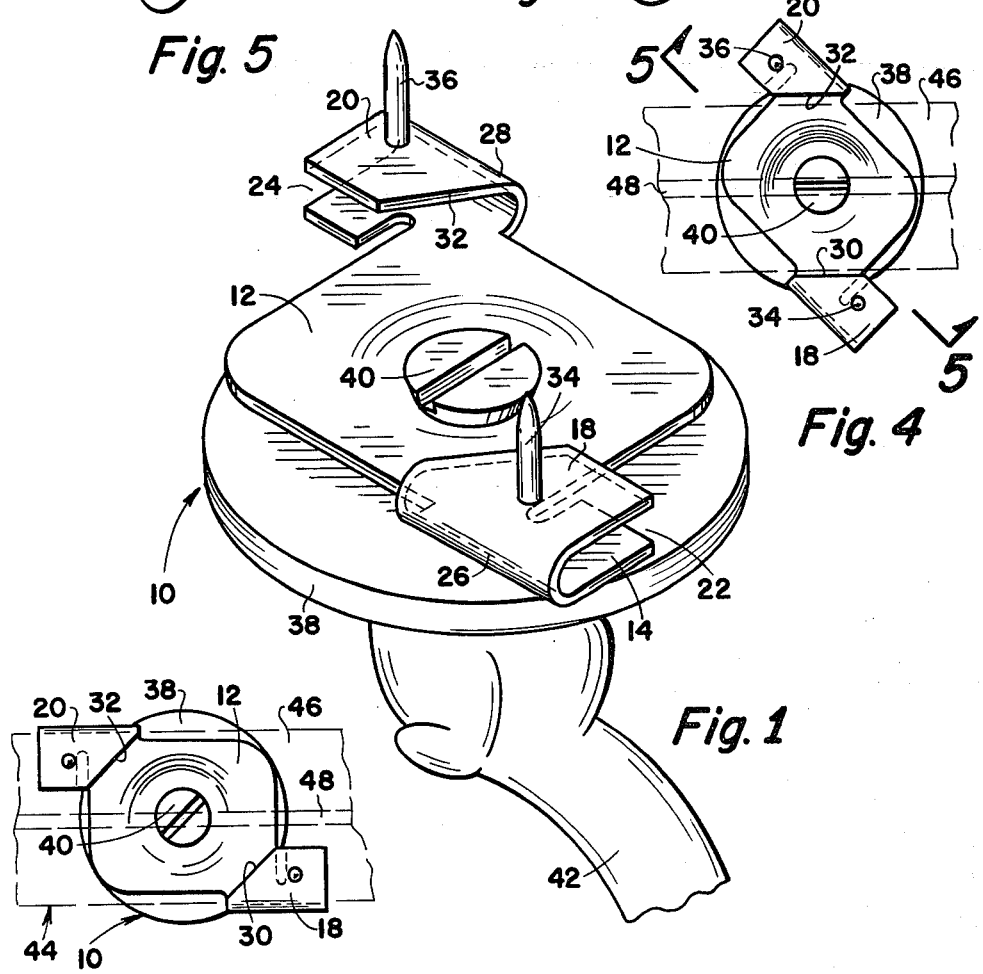

DEVICE FOR SUSPENDING ARTICLES FROM A CEILING OR THE LIKE

CROSS-REFERENCE TO RELATED APPLICATIONS

This is a division of application Ser. No. 921,893, filed July 5, 1978, now U.S. Pat. No. 4,221,355.

This application is related to my co-pending application Ser. No. 899,386, filed Apr. 24, 1978, and entitled "Means for Suspending Articles From a Ceiling".

BACKGROUND OF THE INVENTION

1. Field of the Invention

This invention relates to improvements in hanging devices and more particularly, but not by way of limitation, to a simplified device for facilitating the suspending of articles from a ceiling, or the like.

2. Description of the Prior Art

In many places, such as department stores, grocery stores, offices, and the like, it is frequently desirable to suspend articles, such as displays and the like, from relatively high ceilings. At the present time, it is usually necessary for the person installing the suspended articles to climb relatively high ladders and work in somewhat precarious positions for attaching the holding devices to the ceiling. The hazards of this work are considered disadvantageous by OSHA, and in addition are time consuming for the person doing the installing operation. The device depicted in my aforementioned co-pending application has been developed for overcoming these disadvantages, and is a great improvement over the prior means for suspending articles from a ceiling. However, the device is provided with several working parts which complicates the construction and increases the initial expense as well as the upkeep of the devices.

SUMMARY OF THE INVENTION

The present invention contemplates a novel device for facilitating the suspending of articles from a ceiling, or the like, and which has been particularly designed and constructed for overcoming the foregoing disadvantages. The novel device comprises a main base or plate member having a pair of oppositely disposed flange engaging members adapted for selective engagement with the opposite edges of the strap member of the usual ceiling channel member normally used with present day suspended-type ceiling structures. The flange engaging members may be either sufficiently yieldable for securely engaging the strap member, or may be provided with suitable friction means or the like for substantially precluding accidental disengagement of the device from the ceiling channel. A hook member extends outwardly from the main base member and in the installed position of the device the hook member extends downward from the ceiling for receiving the article or articles thereon which are to be suspended from the ceiling. In order to install the device on a ceiling channel, the base member may be manually positioned in the proximity of the ceiling channel member in any well known manner and properly orientated whereby the opposite edges of the strap member of the channel may be engaged by the flange engaging members. This is usually accomplished by a slight rotational or twisting movement of the device. When the flange engaging members are thus secured to the strap member, the frictional engagement of the device with the strap member substantially precludes accidental disengagement of the device from the strap. However, the operation may be reversed for readily removing the device from engagement with the channel member when it is desired to remove the device therefrom for any reason. The novel device is simple and efficient in operation and economical and durable in construction.

BRIEF DESCRIPTION OF THE DRAWINGS

FIG. 1 is a perspective view of a suspending device embodying the invention.

FIG. 2 is a side elevational view of the device shown in FIG. 1 as installed on a ceiling channel, with the ceiling channel being shown in broken lines for purposes of illustration.

FIG. 3 is a view taken on line 3—3 of FIG. 2.

FIG. 4 is a top view of the device shown in FIG. 1 and shown in a position ready for installation of a ceiling channel, with the ceiling channel depicted in broken lines for purposes of illustration.

FIG. 5 is a view taken on line 5—5 of FIG. 4.

DESCRIPTION OF THE PREFERRED EMBODIMENTS

Figure 9:
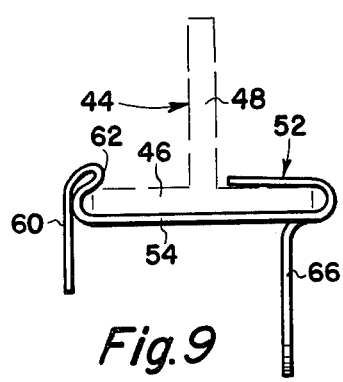
FIG. 9 is a view taken on line 9—9 of FIG. 7.
Figure 8:
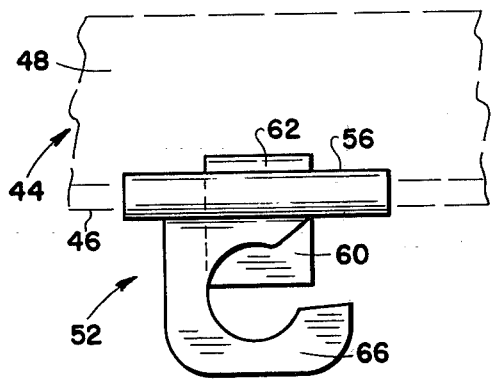
FIG. 8 is a view taken on line 8—8 of FIG. 7.
Figure 7:
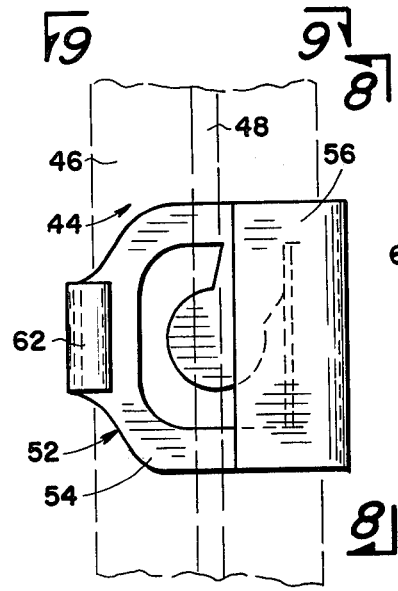
FIG. 7 is a top view of the device shown in FIG. 6 and depicted in position on a ceiling channel, with the ceiling channel being shown in broken lines for purposes of illustration.
Figure 6:
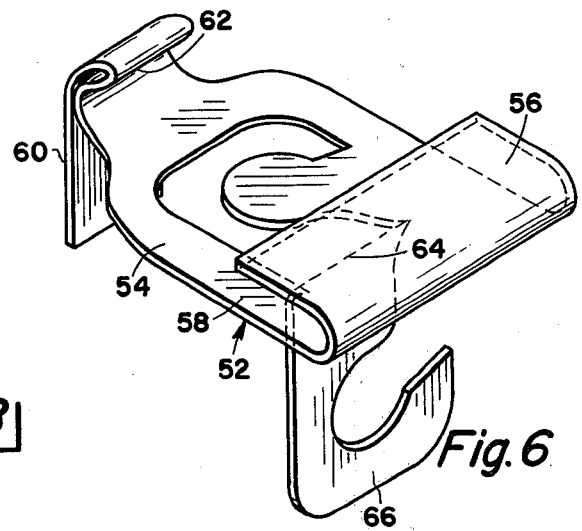
FIG. 6 is a perspective view of a modified suspending device embodying the invention.

Referring to the drawings in detail, and particularly FIGS. 1 through 5, reference numeral 10 generally indicates a suspending device comprising a main base or plate member 12 which may be of substantially any desired planar configuration and as shown herein is substantially rectangular. Outwardly extending flanges 14 and 16 are provided on the diametrically opposite corners of the base 12, and are each provided with a tongue member 18 and 20, respectively, spaced therefrom in substantially mutually parallel relationship for providing a hiatus 22 and 24, respectively, therebetween. Each tongue 18 and 20 is preferably integral with or suitably secured to the respective flange 14 and 16 along the outer edge thereof, as clearly shown at 26 and 28 in FIG. 1. The hiatuses 22 and 24 are open in opposite directions for a purpose as will be hereinafter set forth, and the inwardly directed corners 20 and 32 of the tongues 18 and 20, respectively, are preferably beveled, and substantially parallel to one another for a purpose as will be hereinafter set forth. In addition, each tongue member 18 and 20 is provided with an outwardly extending pin member 34 and 36, respectively, for facilitating retaining of the device 10 in position upon installation thereof as will be hereinafter set forth. The plate 12, flanges 14 and 16 and the tongues 18 and 20 are preferably coated with a suitable plastic material for providing a friction coating to facilitate the installation of the device 10.

A second plate member 38 is pivotally secured to the plate member 12 in any suitable manner, such as a screw member 40 and is disposed oppositely from the tongues 18 and 20. A suitable hook member 42 is carried by or integral with the plate 38 and is movable therewith with respect to the plate 12. The hook 42 as shown in FIGS. 1 through 5 is preferably ornamental in configuration for enhancing the decor of the room in which it is to be utilized. However, it will be apparent that the hook may be of any suitable type for receiving articles (not shown) thereon which are to be suspended from a ceiling, or the like.

In use, the device 10 may be positioned in the proximity of a ceiling channel 44 which normally comprises a substantially horizontally extending strap member 46 and a longitudinally extending rib member 48 substantially perpendicular thereto. In the event the ceiling channel 44 is disposed at an exceptionally great height, it may be desirable to utilize the installation tool disclosed in my aforementioned co-pending application for positioning the device 10 ready for installation on the channel 44. The device 10 may be initially orientated in a manner as shown in FIG. 4 wherein the open ends of the hiatuses 22 and 24 are in substantial alignment with the opposite edges of the strap member 46. The plate 12 may then be rotated in a counterclockwise direction as viewed in FIG. 4 for moving the hiatuses over the strap 46 until the edges of the strap engage the closed ends 26 and 28 of the hiatuses. The friction coating on the plate 12, flanges 14 and 16 and tongues 18 and 20 cooperates with the strap member 46 for retaining the device 10 in engagement therewith for substantially precluding accidental disengagement therebetween. In addition, the usual ceiling tiles 50 (FIG. 2) normally positioned on the upper surface of the strap 46 are penetrated by the pins 34 and 36 for further assuring an efficient installation of the device 10 on the channel 44.

When the plate 12 is thus installed on the channel 44, the plate 38 and hook 42 are suspended beneath the ceiling, and are freely rotatable. Thus, any articles to be suspended from the ceiling may be engaged on the hook 42 in the usual manner, without danger of accidental dislodging of the device 10 from the channel 44. When it is desired to remove the device 10 for any reason, the pins 34 and 36 may be easily manually disengaged from the ceiling tiles 50, and the plate 12 rotated in a clockwise direction as viewed in FIGS. 3 and 4 for releasing the engagement between the hiatuses and the strap 46.

Referring now to FIGS. 6 through 9, a modified suspending device is generally indicated at 52 which comprises a main base or plate member 54 having one end thereof bent or formed in a reverse direction to provide a flange member 56 substantially parallel to the plane of the plate 54 and spaced therefrom to provide a hiatus 58 therebetween. The opposite edge of the plate 54 is provided with a folded portion 60 forming a substantially hook-shaped element 62. The hiatus 58 and hook 62 are open in opposite directions toward the the center of the plate 54 for engaging the opposite side edges of the strap 46, as will be hereinafter set forth. The central portion of the plate 54 is severed in a substantially hook-shaped configuration, with the severed portion bent outwardly along one edge 64 said edge 64 being integral with the plate 54, to provide a hook member 66 extending in an opposite direction from the flange 56 and hook 62.

In order to install the element 52 on the ceiling channel 44, the hiatus 56 may be positioned over one edge of the strap 46 with the plate 54 disposed in the proximity of the lower surface thereof and the flange 56 disposed in the proximity of the upper surface thereof. In this initial position, the plate member 54 will be disposed at a slight angle with respect to the outer surface of the strap 46, and a slight manual upward force may be applied against the plate 54 whereby the hook member 62 will snap over the opposite edge of the strap 46 with respect to the flange 56 and hiatus 58. The hook 62 is preferably of a sufficiently yieldable construction for readily snapping over the edge of the strap 46 and securely retaining the device thereon. With the plate 54 thus installed on the strap 46, the hook member 66 depends downwardly therefrom for receiving the article or articles (not shown) to be suspended from the ceiling. Of course, in the event it is desired to remove the device 52 from the channel 44, the installation procedure may be reversed for easily removing the plate 54 from engagement with the strap 46.

Figure 10:
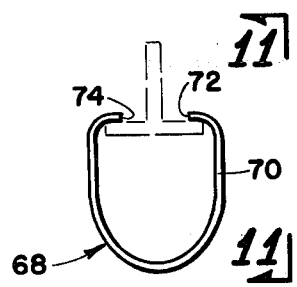
FIG. 10 is an end elevational view of another modified suspending device embodying the invention and shown in position on a ceiling channel with the ceiling channel being depicted in broken lines for purposes of illustration.
Figure 11:
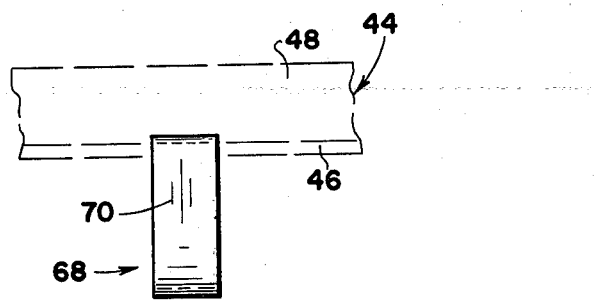
FIG. 11 is a view taken on line 11—11 of FIG. 10.

Referring to FIGS. 10 and 11, reference character 68 generally indicates still another modified suspending device which comprises an elongated strap member 70 preferably constructed from a spring stock metal, but not limited thereto, and formed to a substantially U-shaped configuration as particularly shown in FIG. 10. The opposite ends of the strap 70 are bent inwardly to provide oppositely disposed hook members 72 and 74 for engagement with the opposite side edges of the strap 46 of the ceiling channel 44. The U-shaped strap 70 is suspended below the ceiling when the device 68 is thus secured to the ceiling channel 44, and the article or articles (not shown) to be suspended from the ceiling may be secured through the open U-shaped loop. The yieldable nature of the element 68 facilitates the installation and removal of the device from engagement with the ceiling channel 44.

From the foregoing, it will be apparent that the present invention provides a simple and efficient device for facilitating the securing of articles for suspension from a ceiling, or the like. The novel device comprises a main base or plate member having flange engagement means adapted for engagement with the opposite side edges of the horizontally disposed strap of a ceiling channel and carries a hook member which depends therefrom for readily receiving the articles thereover which are to be suspended. The device may be easily installed on the ceiling channel, and easily removed therefrom.

Whereas the present invention has been described in particular relation to the drawings attached hereto, it should be understood that other and further modifications, apart from those shown or suggested herein may be made within the spirit and scope of this invention.

What is claimed is:

1. A device for facilitating securing of articles to a ceiling and comprising substantially flat main body means for receiving an outer surface of a ceiling channel means there-against, flange engaging means provided on the main body means for selective engagement with the ceiling channel member, hook means carried by the main body means for receiving the articles to be suspended from the ceiling, said flange engaging means comprising a flange engaging member provided at one side of the body and extending in a reverse direction in spaced substantially parallel relation thereto providing a hiatus open for receiving one edge of the channel member therein, a yieldable hook member oppositely disposed from said flange engaging member and adapted for releasable engagement with the opposite edge of the channel member, said yieldable hook member extending in a first direction toward the flange engaging member and then in a reverse direction away from the channel member terminating in a planar member disposed substantially perpendicular with respect to the main body means, and wherein the hook means comprises a hook-shaped member integral with the main body member and extending outwardly therefrom at substantially right angles with respect to the plane of the main body means and in an opposite direction with respect to the flange engaging means.

* * * * *